United States Patent
Keller et al.

[11] Patent Number: 5,722,091
[45] Date of Patent: Mar. 3, 1998

[54] PROTECTIVE EQUIPMENT FOR THE PILOT OF A MILITARY AIRCRAFT, AND A METHOD OF PERSONALIZING THE EQUIPMENT

[75] Inventors: Francois Keller, Breuillet; Fernand Bertheau, Elancourt; Eric Farin, Paris, all of France

[73] Assignee: Intertechnique, Plaisir, France

[21] Appl. No.: 669,353

[22] PCT Filed: Nov. 3, 1995

[86] PCT No.: PCT/FR95/01449

§ 371 Date: Jul. 2, 1996

§ 102(e) Date: Jul. 2, 1996

[87] PCT Pub. No.: WO96/13992

PCT Pub. Date: May 17, 1996

[30] Foreign Application Priority Data

Nov. 4, 1994 [FR] France ................... 94 13231

[51] Int. Cl.⁶ .................................................. A42B 3/18
[52] U.S. Cl. .................................................. 2/6.3; 2/424
[58] Field of Search ....................... 2/424, 6.1, 6.3, 2/6.4, 6.5, 6.7, 417, 418, 419, 15, 10

[56] References Cited

U.S. PATENT DOCUMENTS

| | | | |
|---|---|---|---|
| 3,787,109 | 1/1974 | Vizenor | 350/302 |
| 3,870,405 | 3/1975 | Hedges | 350/294 |
| 3,923,370 | 12/1975 | Mostrom | 350/55 |
| 4,978,182 | 12/1990 | Tedesco | 350/3.7 |
| 5,324,460 | 6/1994 | Briggs | 2/411 |

FOREIGN PATENT DOCUMENTS

| | | |
|---|---|---|
| 0269259 | 6/1988 | European Pat. Off. . |
| 0284389 | 9/1988 | European Pat. Off. . |

*Primary Examiner*—Michael A. Neas
*Attorney, Agent, or Firm*—Larson & Taylor

[57] ABSTRACT

The equipment for military aircraft pilots comprises a helmet (10) having a shell and a visor (18) for placing in front of the eyes. A central portion of the visor is of a shape such that at each point its minimum radius of curvature is substantially in a vertical plane and its maximum radius of curvature is in a plane substantially orthogonal to the preceding plane. The radius of curvature of the visor in the horizontal plane lies in the range 110 mm to 145 mm and its radius of curvature in a vertical plane parallel to the midplane of the helmet varies from about 135 mm in the center to about 75 mm in lateral zones.

8 Claims, 2 Drawing Sheets

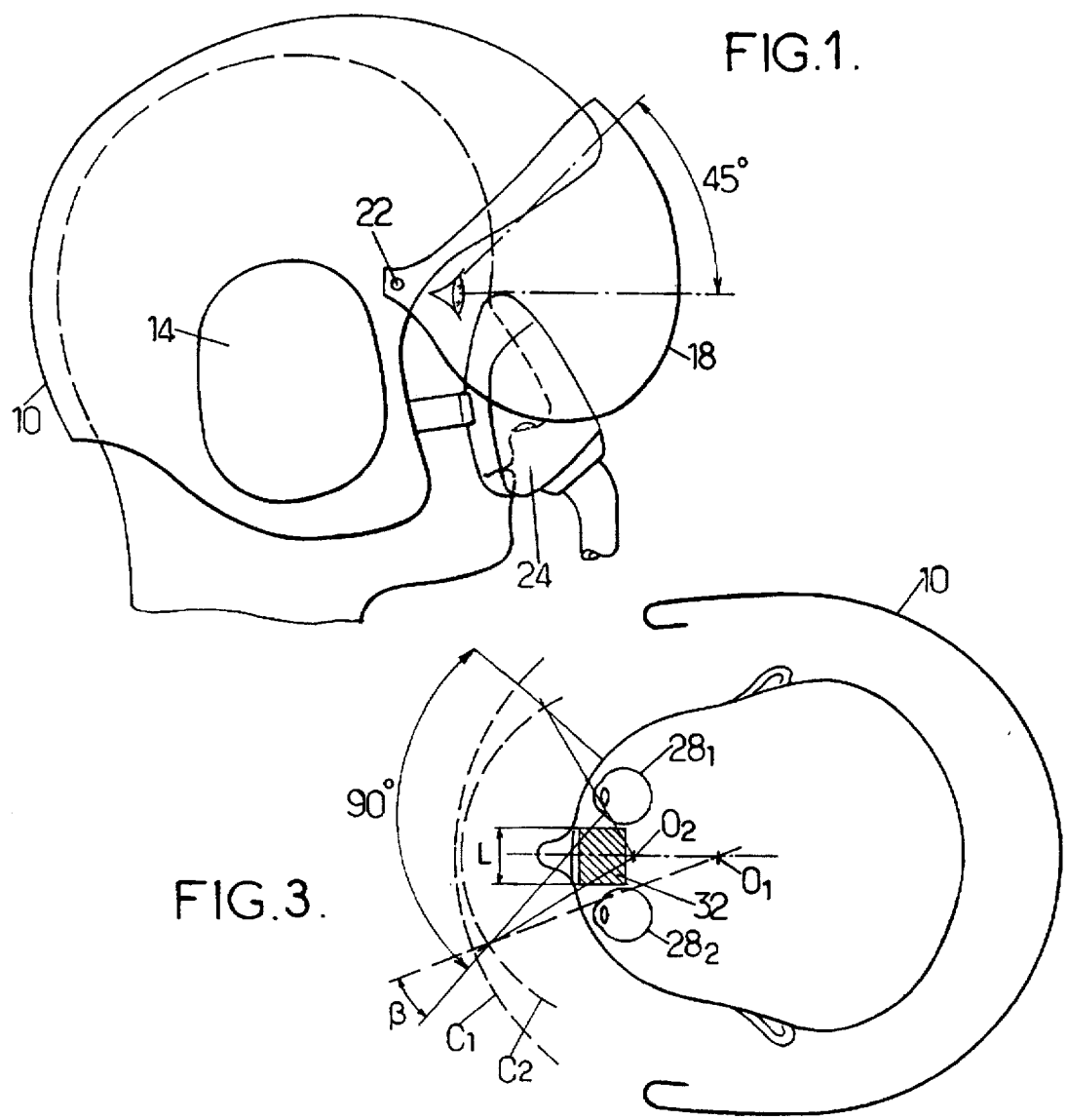
FIG.1.
FIG.3.
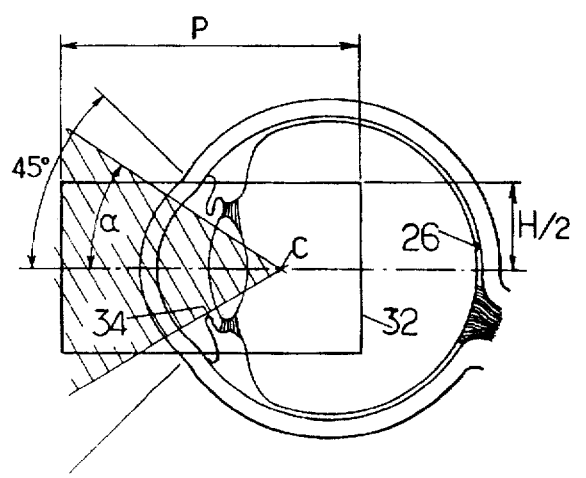
FIG.2.

5,722,091

1

PROTECTIVE EQUIPMENT FOR THE PILOT OF A MILITARY AIRCRAFT, AND A METHOD OF PERSONALIZING THE EQUIPMENT

BACKGROUND OF THE INVENTION

The invention relates to head equipment for pilots of military aircraft (airplanes and helicopters), the head equipment being of the type optionally including a face mask for breathing and comprising a helmet having a shell and a visor for placing in front of the eyes, which visor is generally movable relative to the shell by tilting about an axis which is either orthogonal to the midplane of the helmet or parallel to said plane, the visor tilting between a position in which it protects the eyes and the face and a position in which it disengages the eyes.

The visor must protect the face and the eyes, particularly in the event of ejection. When the helmet is provided with a headup visor, the helmet projects symbols onto the visor, which symbols become superposed on the environment.

In recent years, military aircraft pilots have had to face the threat of laser weapons which deliver a substantially monochromatic light beam of very high power.

Proposals have already been made to protect the retina of a pilot against this danger by coating the visor in thin layers constituting an interference filter which is opaque for the known operating wavelengths of high power pulse lasers. However, the opaque waveband and the density of the protection provided by an interference filter varies strongly as a function of the angle of incidence of the light beam on the filter. Protection that is satisfactory so long as the beam is coming straight at the visor, falls off quickly because of the change of angle of incidence when the beam is oblique.

SUMMARY OF THE INVENTION

The invention seeks to provide head equipment which is better at satisfying practical requirements of providing protection against laser attack than are previously proposed equipments; more particularly, it seeks to limit the angles of incidence at which it is possible for rays to reach the retina, and to do this without significantly reducing the solid angle of vision of the wearer of the equipment.

To achieve this result, the visor is given a shape such that when the visor is in position in front of the face and the eyes, the angles of incidence of rays that are capable of reaching the retina via the pupil are smaller than 15°, with this applying to both eyes, which angle of 15° corresponds more or less to the limit beyond which protection falls off. In practice, it suffices if this result is achieved for beams reaching the eye in a cone having an angle at the apex of 45° around the natural viewing direction. It turns out that when a pilot seeks to look at an object located on one side, he turns the head before his line of sight has moved through an angle of 20° relative to the axis of the head.

The angle of 45° covers any such rotation of the eye relative to its natural position and the zone of the eye to be protected.

As a general rule, helmet shells and visors are provided in a few sizes only. Pilots with very different inter-ocular spacings (in practice over the range 52 mm to 72 mm) may consequently be fitted with helmets and visors having the same predetermined outside shape. It is desirable for the visor to protect the user over all of the above range of inter-ocular spacings.

In practice, this result is often achieved by giving the central portion of the visor a shape such that its radius of curvature in the horizontal plane varies from about 145 mm in the center to about 110 mm in lateral zones, and the radius of curvature in a vertical plane parallel to the midlane of the helmet varies from about 135 mm in the center to about 75 mm in lateral zones. As a general rule, that leads to the visor being made so that all of the centers of curvature lie in a parallelepipedal volume having a width of about 30 mm and a depth of about 30 mm, with said volume being centered about 5 mm in front of the center of a line segment interconnecting the centers of rotation of the two eyes, and the centers of curvature run from the back center of the volume, for the center of the visor, to the front edges of the volume for the lateral portions of the visor.

Often a visor which is substantially spherically shaped, at least in a central zone, will give satisfactory results, having a radius of curvature of about 145 mm and having its center of curvature situated about 10 mm behind the center of the line segment interconnecting the centers of rotation of the two eyes.

Nevertheless, it is possible to use a toroidal shape whose radii of curvature are about 145 mm in the horizontal plane and 135 mm in the vertical midplane.

The invention will be better understood on reading the following description of a particular embodiment, given by way of non-limiting example. The description refers to the accompanying drawings.

BRIEF DESCRIPTION OF THE DRAWINGS

FIG. 1 is a diagrammatic elevation view of the equipment, with the visor in its protective position;

FIG. 2 is a diagram in vertical section showing the volume in which the centers of curvature must be placed;

FIG. 3 is a section view on a plane including the pupils of the wearer of a mask, for showing variations in angle of incidence; and also showing the virtual volume in which the centers of curvature need to be contained in order to provide the required protection.

DESCRIPTION OF PREFERRED EMBODIMENTS

Figure 4:
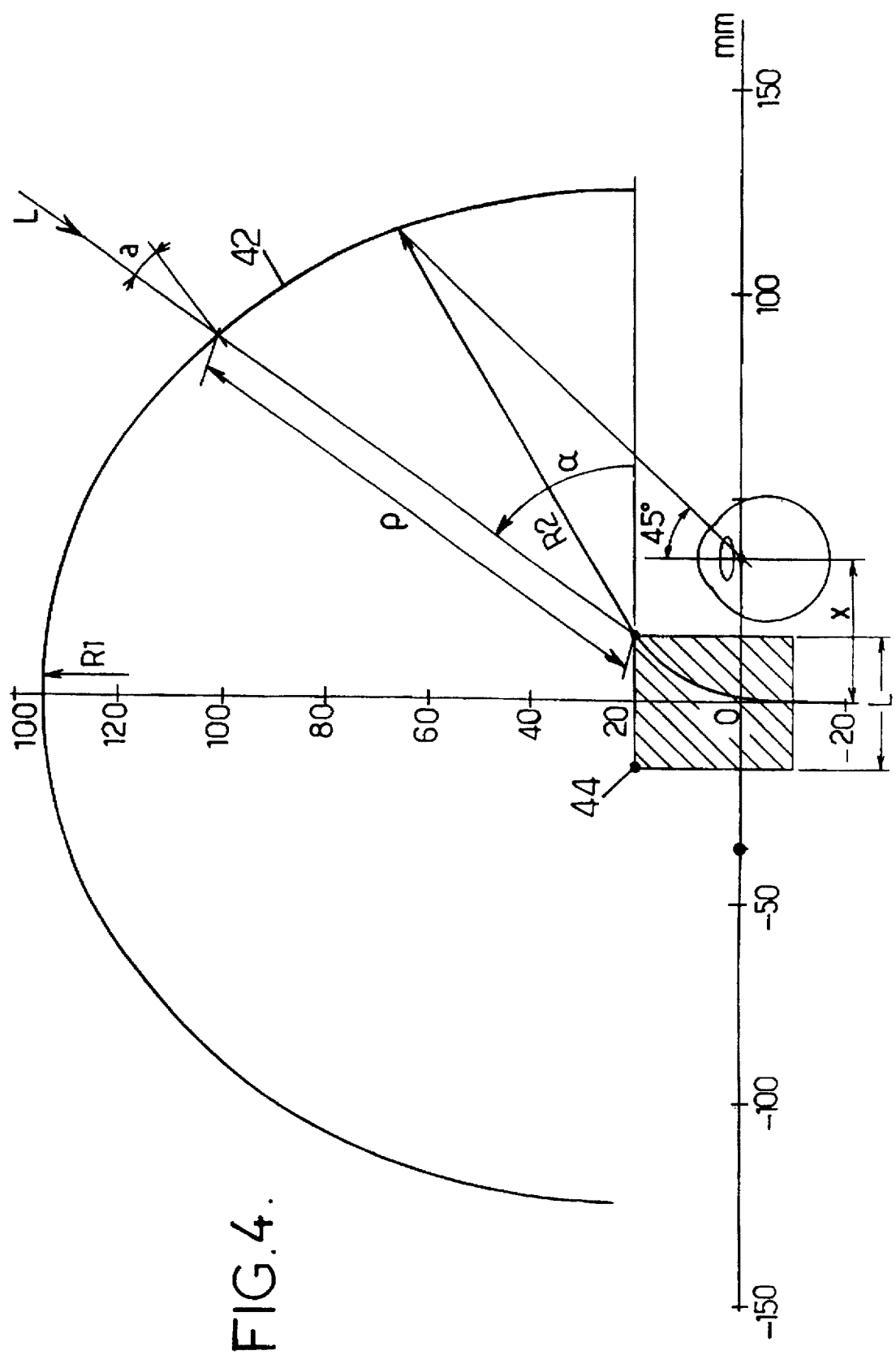
FIG. 4 is a diagram giving a horizontal section for the visor that will often be close to the optimum, and showing how the radii and the centers of curvature vary.

The equipment shown in FIGS. 1 and 2 comprises a helmet having a shell 10 provided with padding (not shown) and with lateral bulges 14 for housing earphones.

A visor 18 is hinged to the helmet in such a manner as to be capable of rotating about a horizontal axis 22. The visor can thus be tilted between a high position where it disengages the eyes and a low position where it protects them and possibly rests against a breathing mask 24.

The invention is also applicable to a visor capable of rotating about an axis parallel to the midplane of the helmet for disengagement purposes, or even to a visor that is fixed on the helmet.

Experience shows that when the wearer of the helmet wants to look sideways, he does not make use of the entire field of view that can be made available by rotating the eyeballs. In practice, as soon as the eyeballs need to rotate through an angle α of more than about 20° from the natural position (FIG. 2), the wearer turns the head instead. Consequently, it suffices to provide the wearer of the helmet with means for providing protection against rays situated in a cone centered on the center C of rotation of the eyeball and having a half-angle at the apex of about 45°, this angle corresponding to the sum of a plus the angle relative to the axis of the eye over which incident radiation can damage the fraction of the retina that is close to the fossae 26.

Conventionally, the visor 18 is coated with a narrow band interference filter centered on the dangerous wavelength in order to protect the eye against radiation having a wavelength corresponding to that of threat, constituting high power pulse lasers. However, such filters do not stop the dangerous wavelength unless they receive the light beam at normal incidence. Any departure from normal incidence shifts the wavelength of light that the filter reflects and also reduces the absorption of the filter. In practice, this degradation becomes perceptible once the angle of incidence exceeds 15°.

For example, if the portion of the visor through which light can pass and reach both eyes is spherical in shape $C_1$, with a center $O_1$ that is clearly behind the eyes $28_1$ and $28_2$ (FIG. 3), then the eye $28_1$ is liable to be reached by rays at an angle $\beta$ of about 30° to the normal. The risk is smaller for rays arriving not laterally, but from above or below, given that both eyes are at the same level, but it nevertheless remains. Experimentally, it has been observed that, when the helmet and the visor are in place on the head, satisfactory protection is obtained only if the centers of curvature at each point of the visor are all within a volume 32 that is in the form of a rectangular parallelepiped, of height H, depth P, and width L. The values of H, P, and L depend, particularly for P and L, on the distance between the pupils, which distance varies from one person to another over the range 57 mm to 72 mm. The most frequent value is close to 62 mm.

The center of this parallelepipedal volume 32 is about 5 mm in front of a line segment interconnecting the centers of rotation of the two eyes, which centers of rotation are situated about 10 mm behind the pupils 34. A width L of 30 mm and a depth P of 30 mm generally give good results.

A visor will often be adopted having a central portion in the form of a spherical cap $C_2$ whose center $O_2$ is placed about 10 mm behind the center of the line segment interconnecting the centers of rotation of the two eyes.

At each point of the visor, it is possible to adopt different radii of curvature in a vertical plane and in a plane passing through the centers of rotation of the two eyes. Often a toroidal shape will give good results, with a radius of curvature in a vertical plane (including the axis of the torus) at each point that is smaller than the radius of curvature in the horizontal plane. Such a shape has the advantage of being relatively simple to make.

FIG. 4 is a horizontal section through the eyes that has given good results in many cases. It has been established in such a manner that the maximum angle of incidence on the most exposed eye is 15° (the angle of incidence on the other eye always being smaller than that), even in the most unfavorable case, which is that of the maximum distance of 72 mm between pupils. This section 42 is in the form of a symmetrical logarithmic spiral which extends in both directions from the midplane to locations in which its tangents are parallel to the midplane. The radius of curvature $R_1$ in the center is 145 mm and the radius of curvature $R_2$ at the point which is at a direction of 45° from one eye is 110 mm. The 30 mm×35 mm volume 44 in which all of the centers of curvature are located is marked by shading. The geometrical locus of the centers of curvature is indicated by a curve in the volume 44.

In a simplified variant embodiment, the central portion of the visor is spherical and has a radius $R_1$, i.e. it has the radius of the super-osculating circle to the spiral at its center.

A shape that is often acceptable also consists in giving the right section level with the eyes a shape such that the following relationship is satisfied:

$$\rho = R.\exp(\alpha.\tan a)$$

where:

$$R = (x_0/\sin a).\exp(-(\pi/2 + a).\tan a)$$

with $x_0$ equals half the maximum expected inter-pupil distance (generally 36 mm);

a is the angle between the ray of incident light LL reaching the eye and the normal to the visor, selected as a function of the level of protection to be guaranteed (generally 15°); and $\alpha$ is the angle between the ray LL and the inter-pupil line.

When the helmet and the visor given to a pilot are personal to him, it is common to fit the head to a shell selected from three or four sizes only. Under such circumstances, the operation of personalizing a helmet, i.e. making padding therefor, also makes it possible to adjust the position of the visor relative to the eyes. The head is held stationary relative to the shell and the visor after verifying that the above condition is satisfied (centers of curvature all lie within the volume 32 or 44), and then the padding is made by filling the intervening space by means of a polymerizable foam.

We claim:

1. Head protection equipment for military aircraft pilot, comprising a helmet having a shell and having a an eye shield for location in front of the eyes of the aircraft pilot, said shield having a central portion of a shape such that, at each point of said central portion, a minimum radius of curvature of said head shield is substantially in a vertical plane and a maximum radius of curvature is in a plane which is substantially orthogonal to the vertical plane, the radius of curvature of the shield in said orthogonal plane lying in the range 110 mm to 145 mm and the radius of curvature in any said vertical plane which is parallel to a vertical mid plane of the helmet varying between about 135 mm in a center zone of said central portion and about 75 mm in lateral zones of said central portion.

2. Equipment according to claim 1, wherein said eye shield is connected to said shell for location about a horizontal hinge axis and said plane substantially orthogonal to said vertical plane passes close to said hinge axis.

3. Equipment according to claim 1, wherein said shield has a coating constituting a narrow band interference filter.

4. Equipment according to claim 1, characterized in that the shield is such that all its centers of curvature lie in a parallelepipedal volume having a length of about 30 mm and a depth of about 30 mm, said volume being centered about 5 mm in front of the center of the line segment joining the two eyes of the wearer, and the centers of curvature run from the rear center of said volume in the center of the shield to the front edges of said volume for the lateral portions thereof.

5. Equipment according to claim 4, characterized in that said central portion is spherical in shape having a radius of curvature of about 145 mm, the center of curvature being situated about 10 mm behind the center of the segment interconnecting the centers of rotation of the two eyes of the wearer.

6. Equipment according to claim 1, characterized in that said central portion is toroidal in shape, having radii of curvature of about 145 mm in the horizontal plane and 135 mm in the vertical midplane.

7. Equipment according to claim 1, characterized in that the shield has a section in the form of a logarithmic spiral in a plane containing the eyes of the wearer and extending in the normal viewing direction.

8. A method for providing a customized head protection equipment for a military aircraft pilot, comprising the steps of:

provingdia a helmet having a shell and having an eye shield for location in front of the eyes of the aircraft pilot, said shield having a central portion of a shape such that, at each point of said central portion, a minimum radius of curvature of said shield is substantially in a vertical plane and a maximum radius of curvature is in a horizontal plane, the radius of curvature of the shield in said horizontal plane lying in the range 110 mm to 145 mm and the radius of curvature in any said vertical plane which is parallel to a vertical mid plane of the helmet varying between about 135 mm in a center zone of said central portion and about 75 mm in lateral zones of said central portion;

locating said helmet and eye shield on the head of the aircraft pilot;

adjusting a position of said eye shield relative to the eyes of the pilot by holding the head stationary relative to the helmet and eye shield in an optimum position; and filling space between said helmet and the head with a polymerizable foam for forming a padding.

* * * * *